United States Patent
Kosaka

(10) Patent No.: US 7,922,915 B2
(45) Date of Patent: Apr. 12, 2011

(54) WASTEWATER TREATMENT SYSTEM AND METHOD OF WASTEWATER TREATMENT

(75) Inventor: Shinichi Kosaka, Fujisawa (JP)

(73) Assignees: NGK Insulators, Ltd., Nagoya (JP); NGK Filtech, Ltd., Chigasaki (JP)

( * ) Notice: Subject to any disclaimer, the term of this patent is extended or adjusted under 35 U.S.C. 154(b) by 0 days.

(21) Appl. No.: 12/477,380

(22) Filed: Jun. 3, 2009

(65) Prior Publication Data
US 2009/0236292 A1    Sep. 24, 2009

Related U.S. Application Data

(63) Continuation of application No. PCT/JP2007/072958, filed on Nov. 28, 2007.

(30) Foreign Application Priority Data

Dec. 25, 2006    (JP) ................. 2006-348049

(51) Int. Cl.
   C02F 1/66    (2006.01)
   C02F 1/00    (2006.01)
   C02F 9/00    (2006.01)
   B01D 21/34   (2006.01)
   B01D 61/14   (2006.01)

(52) U.S. Cl. ........ 210/743; 210/650; 210/744; 210/749; 210/765; 210/97; 210/195.1; 210/195.2

(58) Field of Classification Search .............. 451/60; 210/97, 195.1, 195.2, 650, 743, 744, 749, 210/765

See application file for complete search history.

(56) References Cited

U.S. PATENT DOCUMENTS

| 5,647,989 A | 7/1997 | Hayashi et al. |
| 6,077,437 A * | 6/2000 | Hayashi et al. ............ 210/651 |

FOREIGN PATENT DOCUMENTS

| JP | 62-061691 A1 | 3/1987 |
| JP | 62-083086 A1 | 4/1987 |
| JP | 03-143382 A1 | 6/1991 |
| JP | 06-069551 B2 | 9/1994 |
| JP | 08-115892 A1 | 5/1996 |
| JP | 10-235351 A1 | 9/1998 |
| JP | 11-156164 A1 | 6/1999 |
| JP | 2001-198825 A1 | 7/2001 |
| JP | 2002-050596 A1 | 2/2002 |
| JP | 2005-021805 A1 | 1/2005 |

* cited by examiner

*Primary Examiner* — Duane Smith
*Assistant Examiner* — Paul J Durand
(74) *Attorney, Agent, or Firm* — Burr & Brown

(57) ABSTRACT

A wastewater treatment system including carbon dioxide gas injection means for injecting a carbon dioxide gas into wastewater which takes place during silicon processing to obtain raw wastewater to be treated; a wastewater tank; a filter membrane through which the raw wastewater is filtered; a liquid forwarding pump which forwards the raw wastewater to the filter membrane; and circulation/forwarding control means which can forward concentrated water and/or filtered water to the wastewater tank and which can regulate the pH of the raw wastewater to 4.0 to 6.5 to forward this wastewater to the filter membrane, when the amount of the raw wastewater present in the wastewater tank is below a reference amount.

7 Claims, 2 Drawing Sheets

WASTEWATER TREATMENT SYSTEM AND METHOD OF WASTEWATER TREATMENT

FIELD OF THE INVENTION

The present invention relates to a wastewater treatment system for removing silicon processing waste from silicon processing wastewater which takes place during grinding, polishing and the like of silicon, and a wastewater treatment method using the system.

BACKGROUND OF THE INVENTION

Silicon single crystals are formed into silicon wafers by mechanical processes such as grinding and cutting. For example, in the case of a grown rod of the silicon single crystals, the outer surface of the rod is first ground, and cut into cut rods each having such a predetermined length as to be easily handled. Then, the cut rods are subjected to a slice process to obtain the wafers.

During the grinding or cutting (silicon processing) of the grown rod of the silicon single crystals, grinding water such as industrial water, well water, city water or pure water is used. Therefore, silicon processing wastewater which takes place during the silicon processing contains a large amount of silicon processing waste constituted of fine powder of silicon. When this silicon processing wastewater is discarded or reused, the contained silicon processing waste needs to be separated, and hence it is general to perform a filter treatment by use of a wastewater treatment system including various filters.

As related conventional technologies, there are disclosed a wastewater treatment method of injecting a specific acid component into the silicon processing wastewater as a treatment target to acidify the wastewater and then filtering the wastewater through a filter membrane to suppress the formation of components which clog the filter membrane, and a treatment system (e.g., see Patent Documents 1 to 3).

Patent Document 1: JP-B-6-69551
Patent Document 2: JP-A-2002-50596
Patent Document 3: JP-A-2005-21805

SUMMARY OF THE INVENTION

When the amount of silicon processing wastewater as a treatment target to be supplied, the amount of filtered water to be received, or the like is limited, or when a wastewater treatment system is repaired, the operation of the wastewater treatment system needs to be stopped. However, when the operation of the wastewater treatment system is stopped for a short or long period and then restarted, a filter membrane might rapidly be clogged on occasion even by use of treatment systems disclosed in Patent Documents 1 to 3.

The present invention has been developed in view of such a problem of the conventional technology, and an object thereof is to provide a wastewater treatment system which is not easily influenced by an external factor such as the limitation of the amount of silicon processing wastewater as a treatment target to be supplied or the amount of filtered water to be received or the like, or operation halt and which can treat the silicon processing wastewater in a stable state for a long period without causing any rapid clogging of a filter membrane, and to provide a wastewater treatment method.

The inventors of the present application have made intensive investigations to achieve the above object. According to the analysis of the silicon processing wastewater in the system in which the filter membrane is rapidly clogged, it has been found that immediately after the injection of a carbon dioxide gas, the pH of the silicon processing wastewater having a sufficiently acid state rises to the vicinity of neutrality (=7). Moreover, according to the analysis of the ratio of metal silicon in a solid content contained in the silicon processing wastewater, it has been found that when the filter membrane is rapidly clogged, the concentration of metal silicon in the silicon processing wastewater is lower than immediately after the injection of the carbon dioxide gas. From these analysis results, it has been found that when a considerable time elapses before a filter treatment through the filter membrane, a liquid state of the silicon processing wastewater changes from the neutrality to alkalinity, so that colloidal polymer deposits are gradually easily formed, even in the case of the silicon processing wastewater containing the carbon dioxide gas injected therein.

That is, according to the present invention, a wastewater treatment system and a wastewater treatment method are provided as follows.

[1] A wastewater treatment system which subjects silicon processing wastewater containing silicon processing waste to a filter treatment, comprising: acid fluid injection means for injecting an acid fluid into the silicon processing wastewater to obtain raw wastewater to be treated having a pH of 4.0 to 6.5; wastewater storage means for receiving the raw wastewater; filter means for filtering the raw wastewater to separate the wastewater into concentrated water having an increased content ratio of the silicon processing waste and filtered water; liquid forwarding means for forwarding the raw wastewater from the wastewater storage means to the filter means; and circulation/forwarding control means for continuously or intermittently regulating the pH of the raw wastewater to 4.0 to 6.5 to forward the wastewater to the filter means and for forwarding the concentrated water and/or the filtered water to the wastewater storage means, when the amount of the raw wastewater received in the wastewater storage means is below a reference amount or the separated concentrated water and/or filtered water is above the reference amount.

[2] The wastewater treatment system according to the above [1], wherein in conjunction with the pH of the raw wastewater immediately before the wastewater flows into the filter means, the pH of the raw wastewater is regulated to 4.0 to 6.5 to forward the wastewater to the filter means.

[3] A wastewater treatment system which subjects silicon processing wastewater containing silicon processing waste to a filter treatment, comprising: acid fluid injection means for injecting an acid fluid into the silicon processing wastewater to obtain raw wastewater to be treated having a pH of 4.0 to 6.5; wastewater storage means for receiving the raw wastewater; filter means for filtering the raw wastewater to separate the wastewater into concentrated water having an increased content ratio of the silicon processing waste and filtered water; liquid forwarding means for forwarding the raw wastewater from the wastewater storage means to the filter means; and forwarding restart control means for discharging, from a flow path, a part or all of the raw wastewater retained in at least the flow path right after the wastewater storage means and right before the filter means and then restarting the forwarding of the raw wastewater from the wastewater storage means to the filter means, when the forwarding of the raw wastewater from the wastewater storage means to the filter means stops for a predetermined period.

[4] The wastewater treatment system according to any one of the above [1] to [3], wherein the acid fluid is a carbon dioxide gas.

[5] The wastewater treatment system according to any one of the above [1] to [4], wherein the silicon processing waste is formed by grinding the outer periphery of a silicon ingot.

[6] A wastewater treatment method which subjects silicon processing wastewater containing silicon processing waste to a filter treatment, wherein the wastewater treatment system according to any one of the above [1] to [5] is used.

The wastewater treatment system of the present invention is not remarkably easily influenced by an external factor such as the limitation of the amount of the silicon processing wastewater as a treatment target to be supplied or the amount of the filtered water to be received or the like, or operation halt, and the system produces an effect that the silicon processing wastewater can be treated in a stable state for a long period without causing any rapid clogging of a filter membrane.

The wastewater treatment method of the present invention is not remarkably easily influenced by an external factor such as the limitation of the amount of the silicon processing wastewater as the treatment target to be supplied or the amount of the filtered water to be received or the like, or the operation halt, and the silicon processing wastewater can be treated in the stable state for the long period without causing any rapid clogging of the filter membrane.

DESCRIPTION OF REFERENCE NUMERALS

1: silicon processing machine, 2: wastewater tank, 3: carbon dioxide gas injection means, 4: carbon dioxide gas cylinder, 5: flow rate control valve, 6: carbon dioxide gas injecting section, 7, 10: pH sensor, 8: level switch, 9, 16: liquid forwarding pump, 11: filter membrane, 12, 13 and 14: flow path switch valve, 15: filtered water tank, 20: wastewater treatment system, 30: circulation/forwarding control means, and 40: forwarding restart control means.

DETAILED DESCRIPTION THE INVENTION

Hereinafter, the best mode for carrying out the present invention will be described, but it should be understood that the present invention is not limited to the following embodiment and that the appropriate alternation, improvement or the like of the following embodiment based on the ordinary knowledge of any person skilled in the art without departing from the scope of the present invention is included in the scope of the present invention.

Figure 1:
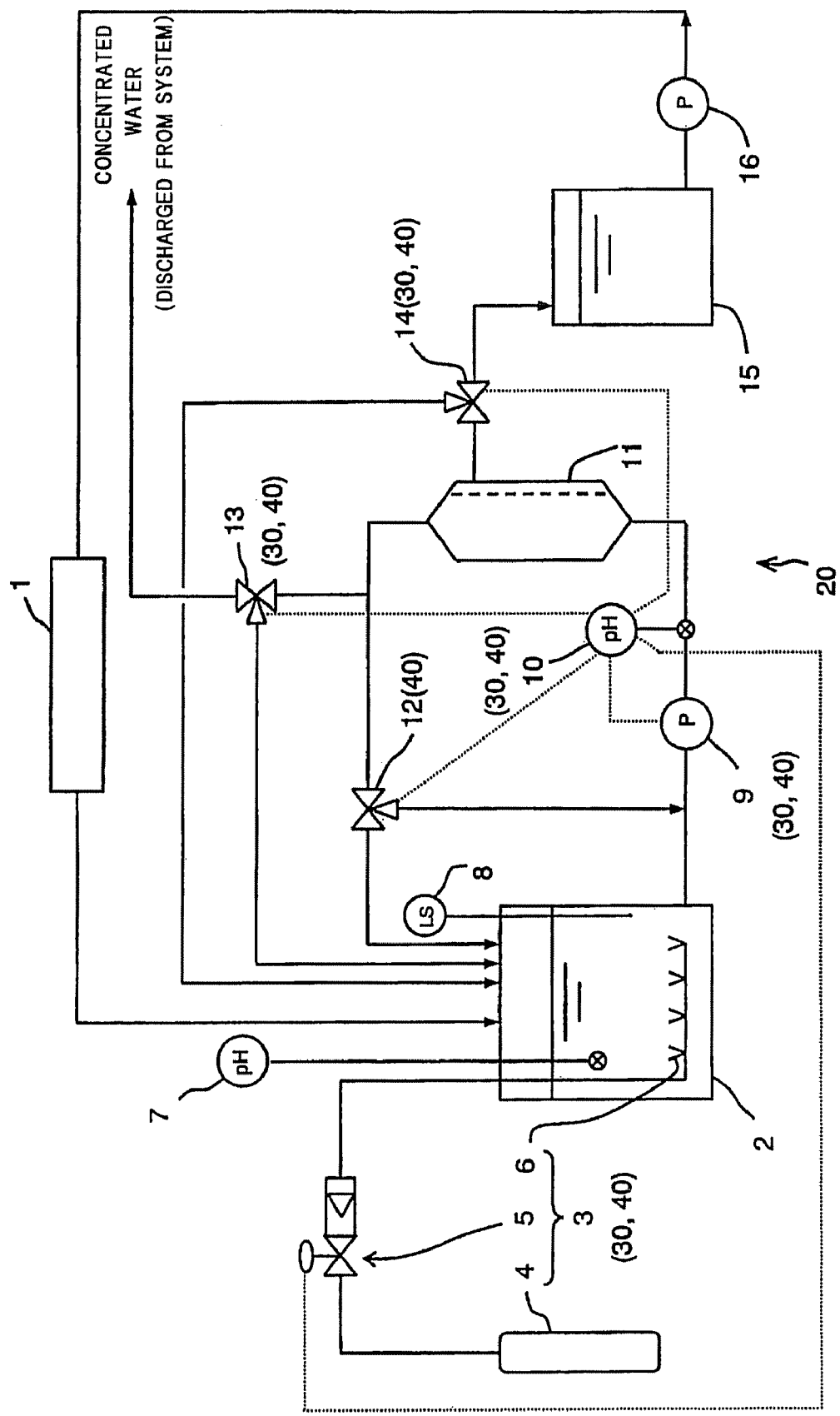
FIG. 1 is a conceptual diagram showing one embodiment of a wastewater treatment system of the present invention.

FIG. 1 is a conceptual diagram showing one embodiment of a wastewater treatment system of the present invention. As shown in FIG. 1, a wastewater treatment system 20 of the present embodiment includes carbon dioxide gas injection means 3, a wastewater tank 2, a filter membrane 11, a liquid forwarding pump 9 and circulation/forwarding control means 30. Hereinafter, the details of the system will be described with reference to the drawings.

The carbon dioxide gas injection means 3 is means capable of injecting an acid fluid into silicon processing wastewater to prepare raw wastewater to be treated having a pH of 5.0 to 6.5. The silicon processing wastewater is industrial wastewater which is formed by the grinding, cutting, polishing or the like of a silicon ingot or a silicon wafer by use of a silicon processing machine 1 or the like and which is discharged. Examples of processing water for use in the processing of the silicon ingot or the like include industrial water, well water, city water and pure water. The discharged silicon processing wastewater includes silicon processing waste.

Examples of the acid fluid to be injected into the silicon processing wastewater include an acid gas such as the carbon dioxide gas, and an acid liquid such as hydrochloric acid or nitric acid. Above all, the use of the carbon dioxide gas is preferable from the viewpoints that the gas can easily be removed from the filtered water obtained by a filter treatment and that the filtered water can be reused.

The carbon dioxide gas injection means 3 includes a carbon dioxide gas cylinder 4, a flow rate control valve 5 and a carbon dioxide gas injecting section 6. After the outflow amount of the carbon dioxide gas from the carbon dioxide gas cylinder 4 is controlled by the flow rate control valve 5, the gas is discharged from the carbon dioxide gas injecting section 6 provided in the wastewater tank 2. The carbon dioxide gas injecting section 6 is constituted of, for example, a porous tube made of a resin or the like, and the carbon dioxide gas discharged in a foam state is bubbled and immediately injected into the silicon processing wastewater. It is to be noted that the pH of the prepared raw wastewater can easily be regulated by controlling the outflow amount of the carbon dioxide gas by the flow rate control valve 5 while monitoring the pH measured by a pH sensor 7 provided in the wastewater tank 2. It is to be noted that even when the pH sensor 7 is not used, for example, the amount of the carbon dioxide gas necessary for obtaining the desired pH value of the resultant raw wastewater may be grasped in advance to inject the gas with a constant flow rate by the flow rate control valve 5.

The wastewater tank 2 is a part which functions as wastewater storage means for receiving the raw wastewater. It is to be noted that the wastewater treatment system 20 shown in FIG. 1 shows a state in which the wastewater tank 2 is provided with the carbon dioxide gas injection means 3, but the wastewater tank 2 and the carbon dioxide gas injection means 3 may be independent of each other.

The liquid forwarding pump 9 is a part which functions as liquid forwarding means for forwarding the raw wastewater from the wastewater tank 2 to the filter membrane 11. It is to be noted that the wastewater treatment system 20 shown in FIG. 1 shows a state in which the liquid forwarding pump 9 is provided in a flow path between the wastewater tank 2 and the filter membrane 11, but there is not any special restriction on a portion where the liquid forwarding pump 9 is provided as long as the raw wastewater can be forwarded from the wastewater tank 2 to the filter membrane 11.

The filter membrane 11 is a part which functions as filter means capable of filtering the raw wastewater forwarded from the wastewater tank 2 and which can separate the inflowing raw wastewater into concentrated water having an increased content ratio of the silicon processing waste and filtered water. There is not any special restriction on the material of the filter membrane 11, but examples of the material include a polymer film, a ceramic film and a metal film. Moreover, examples of the shape of the filter membrane 11 include a hollow fiber membrane, a flat membrane, a tube membrane, a honeycomb structure membrane and a monolith membrane (a multi-lumen membrane). It is to be noted that there is not any special restriction on a filter system, and examples of the system include a filter system (a cross flow system) using a cross flow type filter for allowing the permeation of a part of the raw wastewater through the filter membrane and obtaining the remaining part as non-permeated concentrated water, a direct filter system for allowing the permeation of all of the raw wastewater and an immersion membrane filter system.

The unfiltered water (the concentrated water) flowing out without being filtered through the filter membrane 11 is returned to the wastewater tank 2. Moreover, a flow path switch valve 12 is preferably switched to return the water to the upstream side of the liquid forwarding pump 9. The unfiltered water returned to the wastewater tank 2 or the like circulates through the system, and hence the concentration of the silicon processing waste increases with an elapse of time. In consequence, to keep the appropriate amount of the silicon processing waste included in the raw wastewater, a part of the unfiltered water is continuously or intermittently discharged as the concentrated water from the system.

The filtered water formed through the filter membrane 11 can be received in a filtered water tank 15. It is to be noted that to reuse the filtered water received in the filtered water tank 15, the water can be forwarded to the silicon processing machine 1 by use of a liquid forwarding pump 16 or the like. It is to be noted that a flow path switch valve 14 can be operated so that a part or all of the filtered water is returned to the wastewater tank 2, used for an application other than silicon processing water or discarded as the wastewater.

Figure 2:
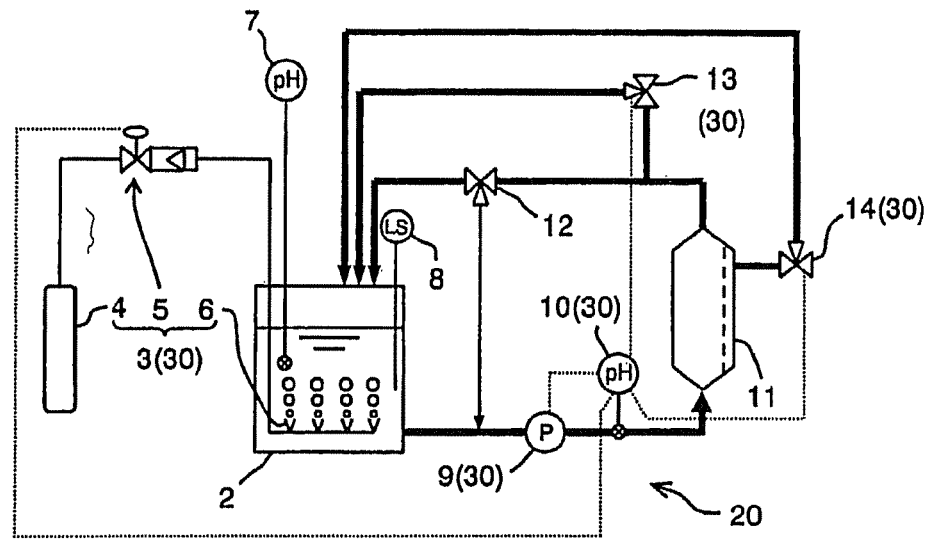
FIG. 2 is a conceptual diagram showing a part of an operation state in the embodiment of the wastewater treatment system of the present invention.

The circulation/forwarding control means 30 shown in FIGS. 1 and 2 is means which can forward the concentrated water and/or the filtered water to the wastewater tank 2 continuously or intermittently in conjunction with the pH of the raw wastewater immediately before the wastewater flows into the filter membrane 11 and which can regulate the pH of the raw wastewater to 5.0 to 6.5 to forward the wastewater to the filter membrane 11, when the amount of the raw wastewater received in the wastewater tank 2 is below a reference amount or the amount of the separated concentrated water and/or filtered water is above the reference amount (hereinafter also referred to as "an operation standby request time (1)").

Examples of "the operation standby request time (1)" include a case where the amount of the silicon processing wastewater lowers when the operation speed of the silicon processing machine 1 lowers or the operation stops, and a case where the filtered water tank 15 and the like are filled with water and hence the filtered water or concentrated water cannot be discharged.

The amount of the raw wastewater received in the wastewater tank 2 can be detected by a level switch 8 or the like. The amount of the raw wastewater as a reference to start the operation of the circulation/forwarding control means 30 may be preset as the reference amount.

As the circulation/forwarding control means 30, a preferable example is a control system in which as shown in FIGS. 1 and 2, a pH sensor 10, the carbon dioxide gas injection means 3, the liquid forwarding pump 9, a flow path switch valve 13 and the flow path switch valve 14 are relay-connected and programmed to operate in conjunction with the pH value measured by the pH sensor 10.

At the operation standby request time (1), as shown in FIG. 2, in conjunction with the pH detected by the pH sensor 10, the flow path switch valves 13, 14 are switched, respectively, to forward the filtered water and the concentrated water to the wastewater tank 2. The filtered water and concentrated water forwarded to the wastewater tank 12 are mixed with the raw wastewater in the wastewater tank 2, and the carbon dioxide gas injection means 3 can be operated in conjunction with the pH detected by the pH sensor 10. When the carbon dioxide gas injection means 3 is operated, the pH of the raw wastewater in the wastewater tank 2 is regulated to 4.0 to 6.5, preferably 5.0 to 6.0, and the liquid forwarding pump 9 may be operated to forward (circulate) the wastewater through the filter membrane 11. It is to be noted that the raw wastewater may be forwarded (circulated) continuously or intermittently. Moreover, to grasp the pH of the raw wastewater immediately before the wastewater flows into the filter membrane 11, even when the pH sensor 10 is not used, for example, a correlation between the forwarding (circulation) time of the raw wastewater and a pH change or the like is preferably grasped in advance, to control the forwarding (circulation) of the raw wastewater by timer control.

Thus, even at the operation standby request time (1), the raw wastewater kept at a specific pH is circulated through the system, whereby the operation standby request (1) is canceled and the time turns to "an operation standby cancel time". Even when the operation of the wastewater treatment system is started again, the silicon processing wastewater can be treated in a stable state for a long period without causing any rapid clogging of the filter membrane.

Figure 3:
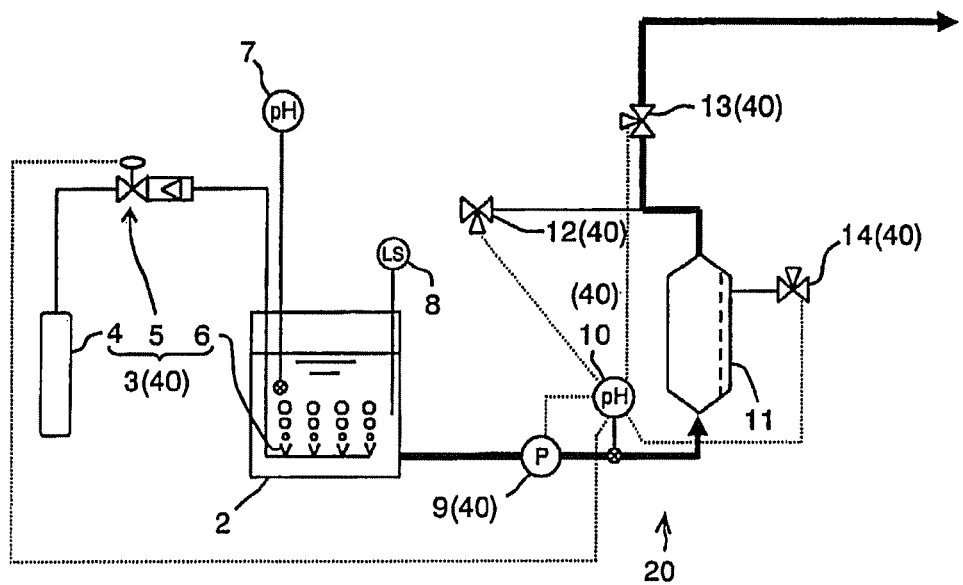
FIG. 3 is a conceptual diagram showing a part of the operation state in the embodiment of the wastewater treatment system of the present invention.

On the other hand, forwarding restart control means 40 shown in FIGS. 1 and 3 is means which can discharge, from the flow path, a part or all of the raw wastewater retained in at least the flow path right after the wastewater tank 2 and right before the filter membrane 11, and then restart the forwarding of the raw wastewater from the wastewater tank 2 to the filter membrane 11, when the forwarding of the raw wastewater from the wastewater tank 2 to the filter membrane 11 stops for a predetermined period (hereinafter also referred to as "an operation standby request time (2)").

Examples of "the operation standby request time (2)" include a case where the operation of the silicon processing machine 1 stops for the long period (the operation of a processing plant stops).

As the forwarding restart control means 40, a preferable example is a control system in which as shown in FIGS. 1 and 3, the pH sensor 10, the carbon dioxide gas injection means 3, the liquid forwarding pump 9, and the flow path switch valves 12, 13 and 14 are relay-connected and programmed to operate in conjunction with the pH value measured by the pH sensor 10.

At the operation standby request time (2), the forwarding of the raw wastewater from the wastewater tank 2 to the filter membrane 11 stops for a predetermined period. Afterward, when the operation standby request (2) is canceled and the time turns to "the operation standby cancel time", as shown in FIG. 3, the flow path switch valves 12, 13 are switched, respectively, to discharge the concentrated water (the unfiltered water) from the system. Moreover, the flow path switch valve 14 is switched so that any wastewater is not filtered through the filter membrane 11. It is to be noted that the carbon dioxide gas injection means 3 is preferably continuously or intermittently operated. In such a state, the liquid forwarding pump 9 is operated to discharge, from the flow path, a part or all of the raw wastewater retained in at least the flow path right after the wastewater tank 2 and right before the filter membrane 11. Afterward, the forwarding of the raw wastewater from the wastewater tank 2 to the filter membrane 11 is restarted.

It is to be noted that the raw wastewater is preferably discharged from the system while monitoring the pH of the raw wastewater retained in the flow path right before the filter membrane 11 by the pH sensor 10. Moreover, even when the pH sensor 10 is not used, the forwarding of the raw wastewater is preferably controlled by, for example, the timer control.

Thus, even when the system operation halts for a long period at the operation standby request time (2) and then the operation of the wastewater treatment system is started again, the raw wastewater retained in the flow path right after the wastewater tank 2 and right before the filter membrane 11 is discharged from the flow path prior to the restart of the operation, and hence the silicon processing wastewater can be treated in the stable state for the long period without causing any rapid clogging of the filter membrane.

EXAMPLES

Hereinafter, the present invention will specifically be described with respect to examples, but the present invention is not limited to these examples.

Example 1

A wastewater treatment system 20 having a constitution shown in FIG. 1 and silicon processing wastewater (raw wastewater) shown in Table 1 were prepared. Next, operation states at an operation standby request time (1) and an operation standby cancel time (after 15 hours) were considered as states shown in Table 2, and the silicon processing wastewater was treated. That is, at the operation standby request time (1), flow path switch valves 13, 14 were switched, respectively, to forward filtered water and concentrated water to a wastewater tank 2. Moreover, the pH of the raw wastewater in the wastewater tank 2 was regulated to 5.2, and the wastewater was continuously forwarded to the filter membrane 11 (a continuous circulating operation). The result of the confirmation of the operation state of the wastewater treatment system 20 after operation standby cancel (after operation restart) is shown as "an operation restart result" in Table 2.

Examples 2, 3 and Comparative Example 1

Silicon processing wastewater was treated in the same manner as in Example 1 described above, except that operation states at an operation standby request time and an operation standby cancel time (after 15 hours) were considered as states shown in Table 2 to treat the silicon processing wastewater. The result of the confirmation of the operation state of a wastewater treatment system 20 after operation standby cancel (after operation restart) is shown as "an operation restart result" in Table 2.

TABLE 1

|  | Silicon processing wastewater (before injection of carbon dioxide gas) | Raw wastewater (after injection of carbon dioxide gas) |
|---|---|---|
| Injection amount of carbon dioxide gas (mg/L) | — | 20 |
| pH | 6.2 | 5.3 |
| Content ratio of metal silicon in solid content (wt %) | 83 | 83 |

TABLE 2

|  |  | Comparative Example 1 | Example 1 | Example 2 | Example 3 |
|---|---|---|---|---|---|
| Operation state at [operation standby request time (1)] | | Full stop | Continuous circulating operation | Intermittent circulating operation | Intermittent circulating operation |
| Details of intermittent circulating operation | | — | — | Start of circulation/forwarding at pH >6.0, end of circulation/forwarding at pH <5.3 | Interval of 30 minutes, continued for 3 minutes |
| Operation state at [operation standby cancel time] | | Immediate restart | Immediate restart | Immediate restart | Immediate restart |
| pH | At operation standby start time | 5.3 | 5.2 | 5.3 | 5.3 |
|  | At operation standby cancel time (after 15 hours) | 7.8 | 5.2 | 5.6 | 5.5 |
| Content ratio of metal silicon in solid content (wt %) | At operation standby start time | 83 | 83 | 85 | 85 |
|  | At operation standby cancel time (after 15 hours) | 67 | 82 | 82 | 84 |
| Operation restart result | | Rapid membrane clogging occurred within 1 hour after operation restart | Stable operation for 3 months or more | Stable operation for 3 months or more | Stable operation for 3 months or more |

Example 4

A wastewater treatment system 20 having a constitution shown in FIG. 1 and silicon processing wastewater (raw wastewater) shown in Table 1 were used, operation states at an operation standby request time (2) and an operation standby cancel time (after 15 hours) were considered as states shown in Table 2, and the silicon processing wastewater was treated. That is, at the operation standby request time (2), the only injection of a carbon dioxide gas was continued, and another operation was stopped. At the operation standby cancel time, flow path switch valves 12, 13 and 14 were switched, respectively, to discharge the concentrated water from the system, and raw wastewater retained in the flow path right after a wastewater tank 2 and right before a filter membrane 11 was discharged from the system. Subsequently, the usual operation of the wastewater treatment system was restarted. The result of the confirmation of the operation state of the wastewater treatment system 20 after operation standby cancel (after operation restart) is shown as "an operation restart result" in Table 3.

TABLE 3

|  |  | Example 4 |
|---|---|---|
| Operation state at [operation standby request time (2)] | | Stop (with the proviso that operation only for injection of carbon dioxide gas was continued) |
| Operation state at [operation standby cancel time] | | Retained water was discharged from system |
| pH | At operation standby start time | 5.4 |
|  | At operation standby cancel time (after 15 hours) | 5.4 |
| Content ratio of metal silicon in solid content (wt %) | At operation standby start time | 83 |
|  | At operation standby cancel time (after 15 hours) | 83 |
| Operation restart result | | Stable operation for 3 months or more |

As shown in Tables 2 and 3, when the wastewater is treated by using the wastewater treatment systems of Examples 1 to 4, unlike a case where the wastewater is treated by using the wastewater treatment system of Comparative Example 1, any rapid membrane clogging is not caused after the operation restart, and the operation can be continued in a stable state over three months or more.

INDUSTRIAL APPLICABILITY

A wastewater treatment system of the present invention is preferably usable in the treatment of silicon processing wastewater containing silicon processing waste which takes from during silicon processing, especially during processing for grinding the outer periphery of a silicon ingot.

The invention claimed is:

1. A wastewater treatment system which subjects silicon processing wastewater containing silicon processing waste to a filter treatment, comprising:
    acid fluid injection means for injecting an acid fluid into the silicon processing wastewater to obtain raw wastewater to be treated having a pH of 4.0 to 6.5;
    wastewater storage means for receiving the raw wastewater;
    filter means for filtering the raw wastewater to separate the wastewater into concentrated water having an increased content ratio of the silicon processing waste and filtered water;
    liquid forwarding means for forwarding the raw wastewater from the wastewater storage means to the filter means; and
    circulation/forwarding control means for continuously or intermittently regulating the pH of the raw wastewater to 4.0 to 6.5 and forwarding the wastewater to the filter means, wherein the circulation/forwarding control system continuously or intermittently circulates at least one of the separated concentrated water and the treated water to the wastewater storage tank when the amount of raw wastewater in the wastewater storage tank falls below a predetermined reference amount, and wherein the circulation/forwarding control system continuously or intermittently circulates the separated concentrated water to the wastewater storage tank when the amount of separated concentrated water in at least one of the wastewater storage tank and the filter membrane is above a predetermined reference amount, and circulates the treated water to the wastewater storage tank when the amount of the treated water in the filtered water tank is above a predetermined reference amount.

2. The wastewater treatment system according to claim 1, wherein in conjunction with the pH of the raw wastewater, the pH of the raw wastewater is regulated to 4.0 to 6.5 immediately before flowing into the filter means.

3. The wastewater treatment system according to claim 1, wherein the acid fluid injection means injects a carbon dioxide gas into the silicon processing wastewater.

4. A wastewater treatment system which subjects silicon processing wastewater containing silicon processing waste to a filter treatment, said system comprising:
    acid fluid injection means for injecting an acid fluid into the silicon processing wastewater to obtain raw wastewater to be treated having a pH of 4.0 to 6.5;
    wastewater storage means for receiving the raw wastewater;
    filter means for filtering the raw wastewater to separate the wastewater into concentrated water having an increased content ratio of the silicon processing waste and filtered water;
    liquid forwarding means for forwarding the raw wastewater from the wastewater storage means to the filter means;
    forwarding restart control means for discharging, from a flow path, a part or all of the raw wastewater retained in at least the flow path right after the wastewater storage means and right before the filter means and then restarting the forwarding of the raw wastewater from the wastewater storage means to the filter means, when the forwarding of the raw wastewater from the wastewater storage means to the filter means stops for a predetermined period; and
    circulation/forwarding control means for continuously or intermittently regulating the pH of the raw wastewater to 4.0 to 6.5 and forwarding the wastewater to the filter means, wherein the circulation/forwarding control system continuously or intermittently circulates at least one of the separated concentrated water and the treated water to the wastewater storage tank when the amount of raw wastewater in the wastewater storage tank falls below a predetermined reference amount, and wherein the circulation/forwarding control system continuously or intermittently circulates the separated concentrated water to the wastewater storage tank when the amount of separated concentrated water in at least one of the wastewater storage tank and the filter membrane is above a predetermined reference amount, and circulates the treated water to the wastewater storage tank when the amount of the treated water in the filtered water tank is above a predetermined reference amount.

5. The wastewater treatment system according to claim 4, wherein the acid fluid injection means injects a carbon dioxide gas into the silicon processing wastewater.

6. A method of wastewater treatment, the method comprising the steps of:
- receiving a raw silicon processing wastewater in a wastewater storage tank;
- treating the received raw silicon processing wastewater with an acid fluid;
- measuring a pH of the raw silicon processing wastewater after treating with the acid fluid in the wastewater storage tank, wherein the pH of the raw silicon processing wastewater is 4.0 to 6.5 after treatment;
- forwarding the raw silicon processing wastewater from the wastewater storage tank to a filter membrane using a circulation/forwarding control system of at least one pump and switchable valves;
- measuring the pH of the raw silicon processing wastewater after the raw silicon processing wastewater is pumped from the wastewater storage tank and before the raw silicon processing wastewater contacts the filter
- filtering the raw silicon processing wastewater to separate into a treated water that is stored in a filtered water tank and a separated concentrated water,
- wherein the circulation/forwarding control system continuously or intermittently circulates at least one of the separated concentrated water and the treated water to the wastewater storage tank when the amount of raw wastewater in the wastewater storage tank falls below a predetermined reference amount, and wherein the circulation/forwarding control system continuously or intermittently circulates the separated concentrated water to the wastewater storage tank when the amount of separated concentrated water in at least one of the wastewater storage tank and the filter membrane is above a predetermined reference amount, and circulates the treated water to the wastewater storage tank when the amount of the treated water in the filtered water tank is above a predetermined reference amount.

7. A method of wastewater treatment, the method comprising the steps of:
- receiving a raw silicon processing wastewater in a wastewater storage tank;
- treating the received raw silicon processing wastewater with an acid fluid;
- measuring a pH of the raw silicon processing wastewater after treating with the acid fluid in the wastewater storage tank, wherein the pH of the raw silicon processing wastewater is 4.0 to 6.5 after treatment;
- forwarding the raw silicon processing wastewater from the wastewater storage tank to a filter membrane using at least one pump and switchable valves;
- measuring the pH of the raw silicon processing wastewater after the raw silicon processing wastewater is pumped from the wastewater storage tank and before the raw silicon processing wastewater contacts the filter;
- filtering the raw silicon processing wastewater to separate into a treated water that is stored in a filtered water tank and a separated concentrated water having an increase content ratio of silicon processing waste; and
- further comprising discharging from a flow path at least part of the raw silicon processing wastewater retained in at least the flow path between the wastewater storage tank to the filter membrane using a restart control system of pumps and switchable valves, and then restarting the forwarding of the raw silicon processing wastewater from the wastewater storage tank to the filter membrane when the forwarding of the raw silicon processing wastewater from the wastewater storage tank to the filter membrane stops for a predetermined time period.

* * * * *